(12) United States Patent
Pioch et al.

(10) Patent No.: US 11,068,175 B2
(45) Date of Patent: Jul. 20, 2021

(54) TECHNOLOGY TO MANAGE CAPACITY LOSS IN STORAGE DRIVES

(71) Applicant: Intel Corporation, Santa Clara, CA (US)

(72) Inventors: Marcin Pioch, Gdansk (PL); Michael Mesnier, Scappoose, OR (US); Anand Ramalingam, Portland, OR (US); Benjamin Boyer, Hillsboro, OR (US); Kapil Karkra, Chandler, AZ (US); Piotr Wysocki, Gdansk (PL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/229,679

(22) Filed: Dec. 21, 2018

(65) Prior Publication Data

US 2019/0146698 A1 May 16, 2019

(51) Int. Cl.
*G06F 3/06* (2006.01)
*G06F 12/1009* (2016.01)

(52) U.S. Cl.
CPC .......... *G06F 3/0631* (2013.01); *G06F 3/0604* (2013.01); *G06F 3/0608* (2013.01); *G06F 3/0632* (2013.01); *G06F 3/0643* (2013.01); *G06F 3/0644* (2013.01); *G06F 3/0665* (2013.01); *G06F 3/0679* (2013.01); *G06F 12/1009* (2013.01); *G06F 2212/1008* (2013.01); *G06F 2212/2022* (2013.01); *G06F 2212/657* (2013.01)

(58) Field of Classification Search
CPC ......... G06F 12/1009; G06F 2212/1008; G06F 2212/2022; G06F 2212/657; G06F 3/0604; G06F 3/0631; G06F 3/0644; G06F 3/0679; G06F 3/0608; G06F 3/0632; G06F 3/0643; G06F 3/0665
See application file for complete search history.

(56) References Cited

U.S. PATENT DOCUMENTS

| 9,558,111 | B1 * | 1/2017 | Balcha | G06F 12/023 |
|---|---|---|---|---|
| 2003/0023811 | A1 * | 1/2003 | Kim | G06F 3/0601 |
| | | | | 711/114 |
| 2011/0145306 | A1 * | 6/2011 | Boyd | G06F 12/0246 |
| | | | | 707/824 |
| 2016/0292816 | A1 * | 10/2016 | Dong | G06F 12/10 |
| 2017/0192895 | A1 * | 7/2017 | Li | G06F 3/0631 |
| 2018/0074708 | A1 * | 3/2018 | Gerhart | G06F 3/0673 |

* cited by examiner

*Primary Examiner* — Jane Wei
(74) *Attorney, Agent, or Firm* — Jordan IP Law, LLC (57) ABSTRACT

A system including a storage drive and a semiconductor apparatus coupled to the storage drive, is provided. The semiconductor apparatus may include one or more substrates and logic coupled to the one or more substrates, the logic coupled to the one or more substrates to: initiate managing resources of the storage drive and, if the storage drive loses capacity, determine an amount of capacity loss, create a reserved file that is associated with logical memory space in a file system, based on the amount of the capacity loss, and erase at least a portion of the reserved file so that logical memory space associated with an un-erased portion of the reserved file is usable by the storage drive.

9 Claims, 8 Drawing Sheets

TECHNOLOGY TO MANAGE CAPACITY LOSS IN STORAGE DRIVES

TECHNICAL FIELD

Embodiments generally relate to storage drives such as, for example, a solid-state drive (SSD), hard drive, etc. More particularly, embodiments relate to managing capacity loss of a storage drive over time.

BACKGROUND

Storage drives may encounter problems related to loss of available capacity. The capacity of some storage drives may decrease over time.

SSDs, for example, contain NAND flash memory, the fundamental unit of which is typically a 4 kilobyte (KB) page. In SSDs, data writes may occur one page at a time, but only on blank (erased) pages. Pages may not be directly overwritten, rather they must first be erased. When a host wants to rewrite data to an address of a NAND of an SSD, the SSD writes to a different, blank page and then updates a logical block address (LBA) table. Inside the LBA table, the original page is marked as "invalid" and the new page is marked as the current location for the new data. Overprovisioning is employed to reserve extra space to account for the above-described write operations and the concomitant loss of available SSD capacity (e.g., NAND capacity) that occurs over time.

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

Because of memory shrinking capacity issues, memory and computing device vendors may overprovision storage drive (e.g., SSD) capacity in order to provide better write performance and higher endurance. That is, such vendors routinely advertise significantly more memory capacity for their SSDs than they actually make available for a host device (also referred to as "host"). Therefore, SSDs typically have additional hidden capacity, which usually equals 5%-100% of the capacity exposed to the host. This hidden capacity increases the available "ready to be written" resource pool, which decreases write amplification—for example, due to the nature of NAND Flash Memories in that a block in the NAND must be erased before new data can be written to the NAND block, extra NAND operations may be required to move data stored in the SSD more than once. This extra movement of data may involve erases and writes to accommodate a host write request. These extra NAND write operations create a multiplying effect producing an "amplification" effect; thus, the term, "write amplification". By overprovisioning as described above, since there is less background data movement, performance and endurance increases. The instant disclosure and exemplary embodiments thereof may produce an exemplary result of decreasing the required amount of additional memory to a smaller percent of the exposed capacity (i.e., lessen or completely remove the need for overprovisioning).

Another issue with SSDs is that, in the manufacturing process of SSDs, all NAND dies placed in a particular SSD are checked to determine if they work correctly. If one or more NAND dies have lower capacity than desired, they are discarded in post-production process. This approach may result in a waste of NAND flash memory. The exemplary solutions described below may reduce the necessity to discard NAND dies that have lower capacity than desired since the instant solution manages the capacity loss of a SSD.

Additionally, sometimes NAND dies are organized in packages. If at least one NAND die in a package is damaged, the entire package may be discarded because all NAND dies of a particular SSD model may be required have the same capacity. Thus, if one NAND die does not have the exact same capacity as other NAND dies in a package, the entire package may have to be discarded. Exemplary solutions as described below may also reduce the necessity to discard an entire package of NAND dies because the NAND dies in the package do not have the exact same capacity.

According to exemplary embodiments of the instant disclosure, SSDs with different capacity may be used, so NAND dies with lower capacity than expected may still be able to be used in the SSD and would not need to be discarded.

Also, an aspect of the instant disclosure may advantageously affect cold storage approaches of SSDs, such that SSD-data is not frequently invalidated and such that SSDs that are managed according to the exemplary embodiments may have a very low overprovisioning ratio. Cold storage is a term related to storing data that is infrequently accessed. That is, cold storage may refer to data that was written some time ago and not read for a long time. The advantageous results may be achieved by way of exemplary embodiments that involve an SSD with shrinking capacity and host-based software, where the host-based software handles capacity loss events deriving from the SSD. Such software may be designed and implemented to operate with existing file systems without any modifications in the file systems. For example, when an SSD notifies host-based software about a capacity change, the host-based software may algorithmically shrink the available capacity of the SSD by a requested capacity. An SSD may notify the host system over a storage interface, such as, for example, Non-volatile Memory Express (NVMe) or Serial Advanced Technology Attachment (SATA), and by using input/output (IO) control codes on the operating system side of the host system.

Advantages of the instant disclosure may include, but are not limited to, enabling software to work with new types of SSDs (with shrinking capacity), not requiring application changes, and the ability to shrink the capacity of SSDs such that the cost of SSDs is decreased, which may increase profit margins on the sale of SSDs. Thus, the entire capacity of an SSD may include the space available for use and other internal space (e.g., memory used for garbage collection in the SSD).

Figure 1:
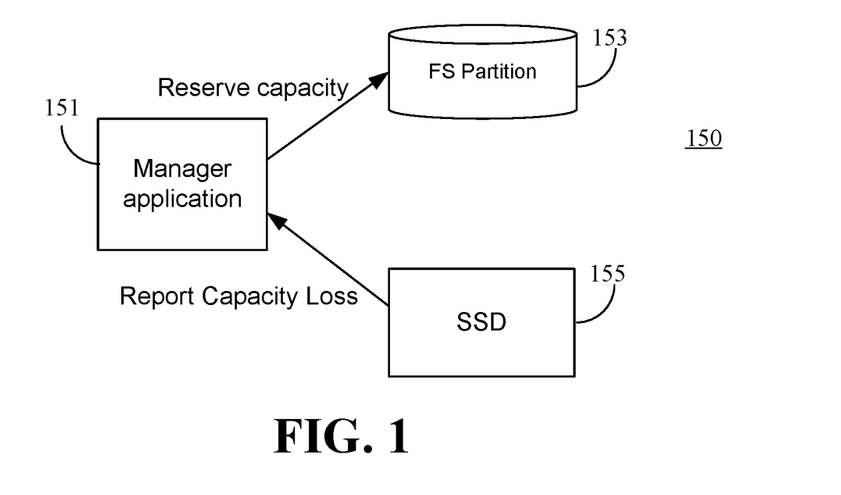
FIG. 1 illustrates an example of a memory management system according to an exemplary embodiment.

Turning now to FIG. 1, a memory management system 150 is shown. The memory management system 150 may be a single computing device or system which includes a manager application 151, a file system (FS) partition 153 and an SSD 155, which includes, for example, NAND memory devices for storage. The manager application 151 may also be implemented via logic coupled to one or more substrates of a semiconductor apparatus, a manager application server and/or a computing device (not shown). The manager application 151 may alternatively be implemented over a network remote from the memory resources that are being managed. In memory management system 150, SSD firmware may have the ability to increase memory space which is hidden from the operating system (OS). The firmware may be applied, for example, via the manager application 151 of the memory management system 150 or, alternatively, applied from a remote location. Such may be necessary in the event that: 1) a NAND Erase or NAND Program command does not succeed, 2) a particular NAND block is discarded, and 3) there is a need to use another NAND block.

According to an exemplary embodiment as reflected in FIG. 1, software may be implemented via the manager application 151 to manage Capacity Loss Events of an SSD 155. In the memory management system 150 of FIG. 1, software may use Capacity Loss Units 291 (FIGS. 2A and 2B) to manage Capacity Loss Events. As shown in FIG. 2B, the size of the Capacity Loss Unit 291 may correspond, for example, to a particular amount of data loss that would alert a system to a Capacity Loss Event. A Capacity Loss Unit is a fixed size unit expressed in logical block address space in memory of the SSD—in other words, a capacity loss may relate to a loss of logical memory space. A Capacity Loss Unit may be deallocated (e.g., "trimmed"). "Trim" may mean, for example, to erase at least a portion of or the entire Capacity Loss Unit. For example, a Capacity Loss Unit may be a logical representation of a data block to be at least partially erased via an algorithm, rather than a physical block of data. The algorithm itself may divide, e.g., a filename system namespace of an SSD into Capacity Loss Units.

According to an exemplary embodiment, an SSD 290 (FIG. 2B) may be equally divided into a predetermined or specific number of Capacity Loss Units 291. Each Capacity Loss Unit 291 may have the same size. Alternatively, there may be an SSD according to a different exemplary embodiment, with very small Capacity Loss Units of different size, where the amount of Capacity Loss is determined based on the number of lost Capacity Loss Units.

Figure 2A:
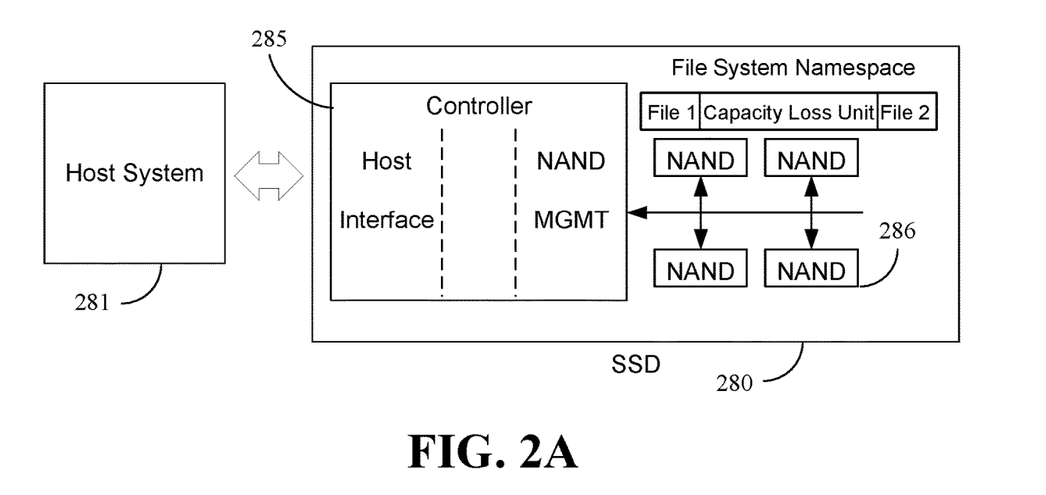
FIG. 2A illustrates an abstract view of communications between a host system and an SSD according to an exemplary embodiment.
Figure 2B:
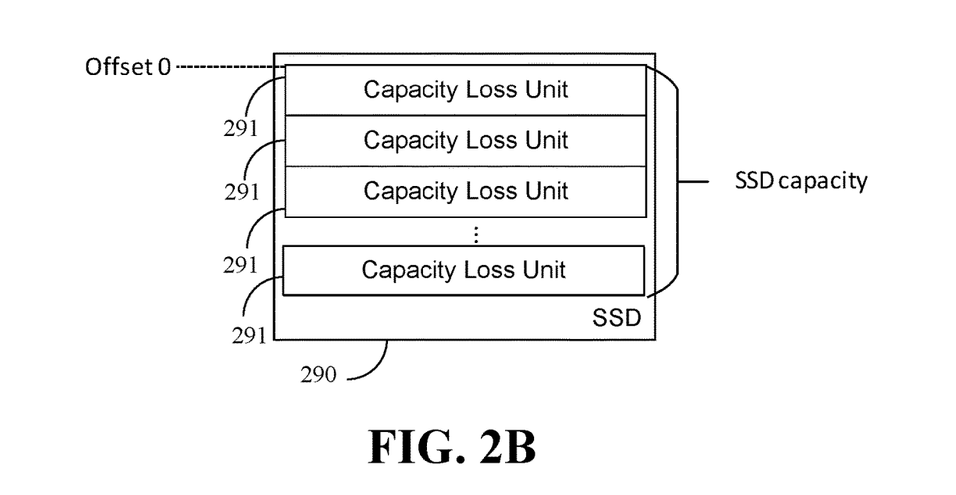
FIG. 2B illustrates an abstract view of an example of an SSD according to an exemplary embodiment.

FIG. 2A illustrates communications between a host system 281 and an SSD 280. The SSD 280 may include a controller 285 which manages an interface for communicating with the host system 281 and the non-volatile memory devices 286 (e.g., NANDs), which constitute the SSD 280. In FIG. 2A, Capacity Loss Units may be illustrated as part of a file system namespace, where there may be actual files (e.g., two files, File 1 and File 2) and a Capacity Loss Unit.

According to an exemplary embodiment, software, via a manager application 151, may use input/output control codes to exchange information with the SSD. Alternatively, SATA and NVMe commands may be used to exchange information with the SSD. The following operations are possible via the exchange of information with the SSD: 1) Read Capacity Loss Unit Size; 2) Read Capacity Loss Units, which means the overall number of already lost capacity may be expressed in Capacity Loss Units; and 3) Register for Asynchronous Capacity Loss Event. According to an exemplary embodiment, asynchronous events may be those events occurring independently of a main program flow.

According to an exemplary embodiment, software, via a manager application 151, may also use file system application programming interfaces (APIs) to create Reserved Files. A Reserved File is a file created by the software to allocate space in a file system. Reserved Files may be managed only by the software according to exemplary embodiments. A file system API may also be used to inform the solid-state drive which blocks of data inside a Reserved File are no longer in use and can be erased internally. The file system API may also initiate the operation of wiping or erasing the data. For example, one or more of the operations of informing the SSD or initiating the erasing of data, as described above, may be performed by way of a TRIM command (issued by a host to the SSD).

According to an exemplary embodiment, a software-based algorithm for managing memory resources of an SSD may include an Initialization Flow and a Capacity Loss Flow. An Initialization Flow may relate to an initialization that is performed once an SSD is discovered in a system. Such an Initialization Flow is also applicable when a new partition is created on an SSD or in a computing system having an SSD. An initialization process may include reading several parameters from an SSD to set up the algorithm.

A Capacity Loss Flow according to an exemplary embodiment may include a process that is performed when an SSD reports a Capacity Loss (e.g., memory capacity loss). Software implemented via manager application 151 may consume lost space by creating a new Reserved File to match the loss in memory capacity. The memory/NAND blocks associated with this new Reserved File may then be entirely erased or at least partially erased so that the memory associated with that file can still be used by the SSD. That is, at least a portion of the memory/NAND blocks associated with the Reserved File may be erased so that logical memory associated with an un-erased portion of the file is usable by the storage drive. Such memory space may be determined by a host and may be referred to as 'free space' or 'deallocated memory space'. In other words, the loss in memory capacity may be reflected as logically consumed space in the file system, not physically consumed space in the SSD.

Figure 3:
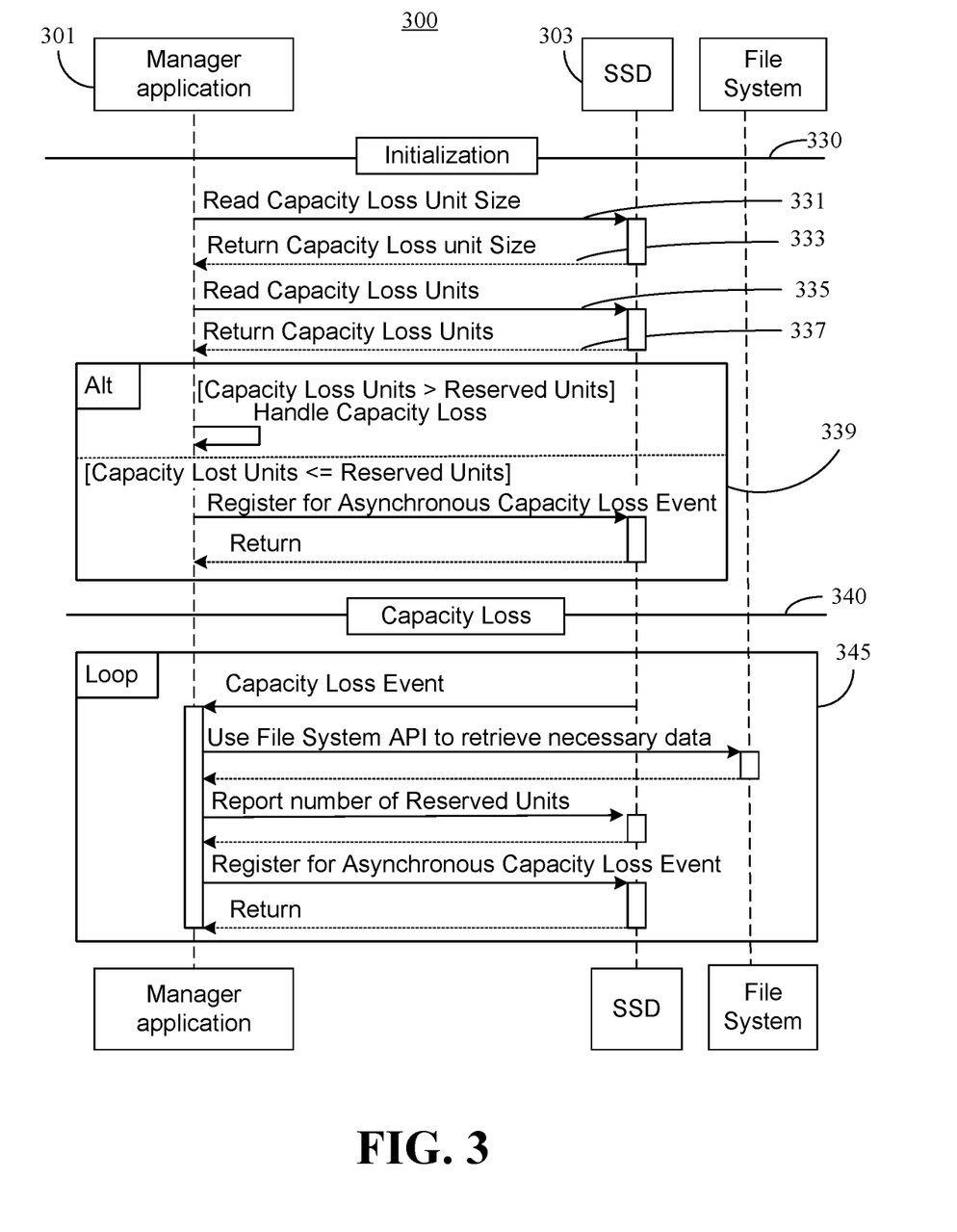
FIG. 3 is a sequence diagram of an example of a method of managing memory resources of an SSD according to an exemplary embodiment.

FIG. 3 illustrates a sequence diagram of a method 300 for managing memory resources of an SSD according to an exemplary embodiment. The sequence flow shows example illustrations of the Initialization Flow 330 and Capacity Loss Flow 340, which are described above. The Initialization Flow 330 is the initial process necessary to determine the capacity of an SSD with respect to its Capacity Loss Units and the Capacity Loss Flow 340 is the flow that is executed when a drive notifies software about a Capacity Loss.

In FIG. 3, during an Initialization Flow 330, operation 331 shows a manager application 301 reading a Capacity Loss Unit Size of the SSD 303. As an optional feature, prior to, during, or after operation 331, a Victims File List (not shown) may be provided. A Victims File List may include a sacrificial list of files that may be deleted if capacity begins to run out (e.g., when no more Reserved Files can be created because all of the logical capacity in the file system has been used). In operation 333, the Capacity Loss Unit Size may be obtained from the SSD and stored.

As an alternative to reading the Capacity Loss Unit Size, a manager application may request a Capacity Loss Size from an SSD controller (e.g., element 285 in FIG. 2A) and the requested Capacity Loss Unit Size may be returned from the SSD controller.

In operation 335, the manager application 301 may read the number of Capacity Loss Units of the SSD 303. In operation 337, the number of Capacity Loss Units may be obtained from the SSD 303. As an alternative operation, the manager application 301 may request the number of Capacity Loss Units from an SSD controller and the requested the number of Capacity Loss Units may be returned from the SSD controller.

In an exemplary embodiment, the manager application 301 may calculate already Reserved Space, which is a sum of the Usable Size of each Reserved File on a partition, where Usable Size of a Reserved File is a sum of all Capacity Loss Units that fit into particular Reserved file.

In operation 339, a manager application 301 may check if previously Reserved Space on the file system is greater than, less than, or equal to Capacity Loss Units. If previously Reserved Space on the file system is greater than or equal to Capacity Loss Units, then initialization is complete; otherwise additional Reserved File capacity has to be reserved in the Capacity Loss Flow 340 part of the method of managing memory resources 300.

FIG. 3 also shows a Capacity Loss Flow 340. During Capacity Loss Flow 340, capacity loss detection may be a background process that involves detecting a Capacity Loss Event from a drive (e.g., SSD). This background process may include reserving space on the file system by creating Reserved Files. Reserved Files may be created to use up the amount of capacity that has failed in the SSD, but they do not consume actual (good) physical blocks of memory in the SSD. That is, Reserved Files may be used to represent logical space in the file system, which cannot be used by a user. Reserved Files do not actually occupy any physical blocks of memory in the SSD.

To reserve space on the file system by creating Reserved Files, software implemented via the manager application 301 according to an exemplary embodiment may erase at least a portion of all blocks in the Reserved Files after creating them. This erase operation ensures that the Reserved Files consume only failed memory space that is assigned to logical memory space in the file system.

While FIG. 3 only shows operations of a Capacity Loss Flow loop 345 at a high level (i.e., 1. Use File System API to retrieve necessary data, 2. Report Number of Reserved Units, 3. Register for Asynchronous Capacity Loss Event, etc.), according to an exemplary embodiment, if a Capacity Loss Event occurs, the following Capacity Loss flow operations may occur:

1. Read Capacity Loss Units from the SSD.
2. Calculate Required Capacity value—it is the difference between current Capacity Loss Units value and the previous value, expressed in bytes.
3. Check free space (unused space) on the file system—if free space on the file system is greater or equal than Required Capacity value, then go to operation 7 below.
4. Select candidate file(s) to be removed (e.g., from Victim File list)—algorithm may pick the file(s) based on the closest match of the size of the file.
5. Delete selected file(s) from the file system.
6. Disable any FS defragmentation for the new Reserved File that is about to be created.
7. Create the new Reserved File of size equal to the Required Capacity value.
8. Read physical Reserved File placement from the file system—in general, the Reserved File may be placed in multiple locations (sub-regions) in memory in a SSD, for example.
9. Find all Capacity Loss Units (e.g., those which fit into the Reserved File).
10. Calculate Usable Size of the Reserved File, which means the sum of the sizes of all detected Capacity Loss Units.
11. If the calculated Usable Size is lower than the Required Capacity value, then set a new Required Capacity value based on a subtraction of Usable Size from the Required Capacity, and proceed to operation 3 above.
12. For each Capacity Loss Unit, send a command to at least partially erase the Capacity Loss Unit, to SSD.
13. Register for new Asynchronous Capacity Loss Event Operations 1-13 above may be performed within a Capacity Loss loop 345.

Figure 4:
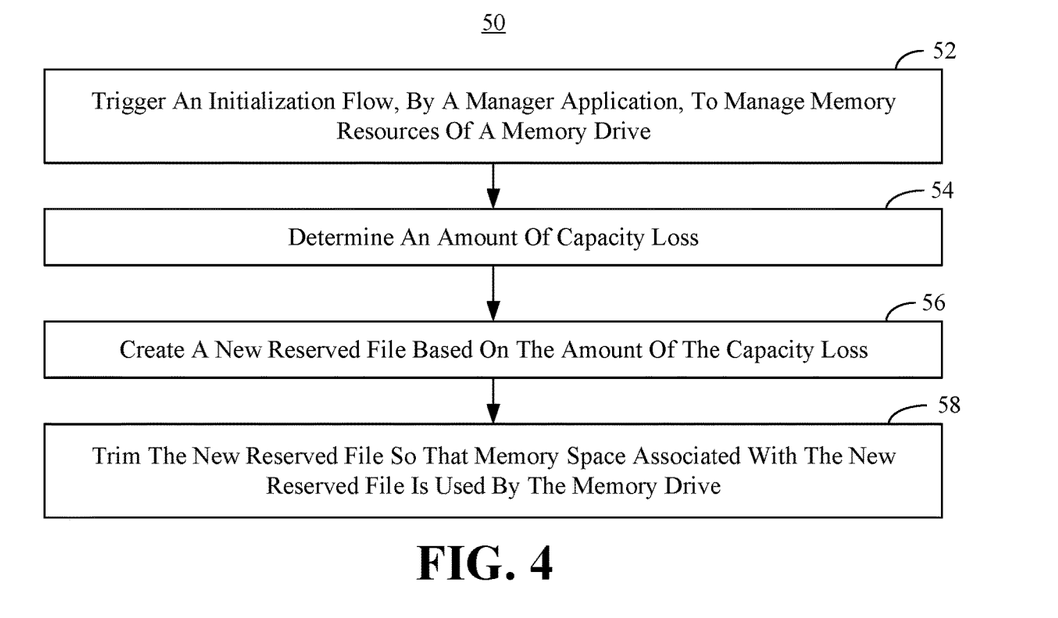
FIG. 4 is a flowchart of an example of a method of managing memory resources of an SSD according to an exemplary embodiment.

FIG. 4 shows a method of managing memory resources of a SSD according to an exemplary embodiment. The method 50 may be implemented in one or more modules as a set of logic instructions stored in a machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality hardware logic using circuit technology such as, for example, application specific integrated circuit (ASIC), complementary metal oxide semiconductor (CMOS) or transistor-transistor logic (TTL) technology, or any combination thereof.

For example, computer program code to carry out operations shown in the method 50 may be written in any combination of one or more programming languages, including an object-oriented programming language such as JAVA, SMALLTALK, C++ or the like and conventional procedural programming languages, such as the "C" programming language or similar programming languages. Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Illustrated processing block 52 provides for initializing, by a manager application, an initialization flow to manage memory resources of an SSD. Additionally, if the SSD loses capacity, block 54 provides for determining the amount of capacity loss, block 56 provides for creating a new reserved file based on the capacity loss, and block 58 provides for erasing at least a portion of the new reserved file so that memory space associated with the new reserved file is used by the SSD.

Figure 5:
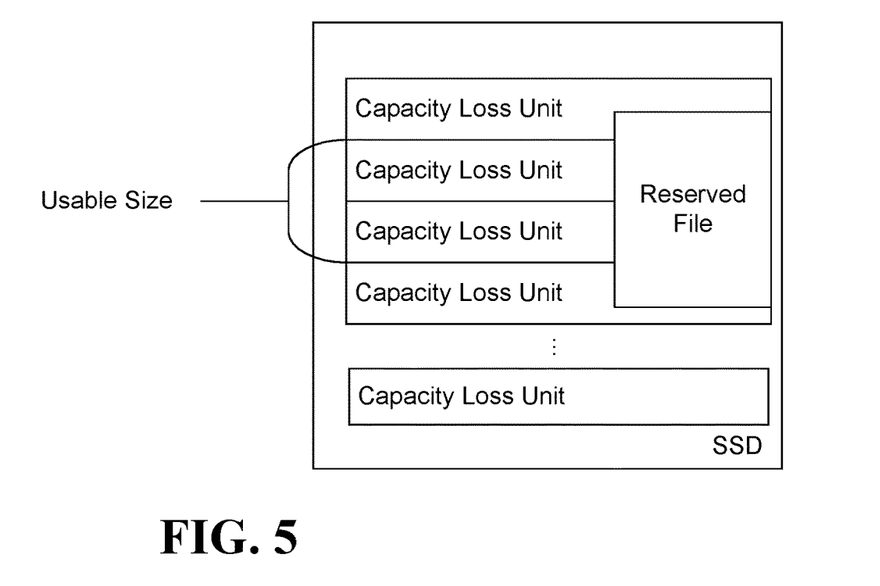
FIGS. 5-7 illustrate block diagrams of an example of an SSD according to an exemplary embodiment.
Figure 6:
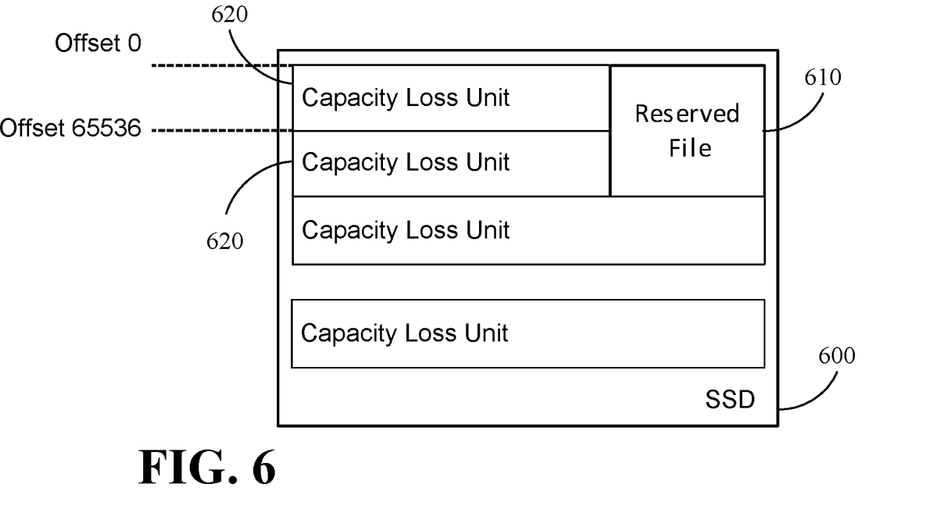
Figure 7:
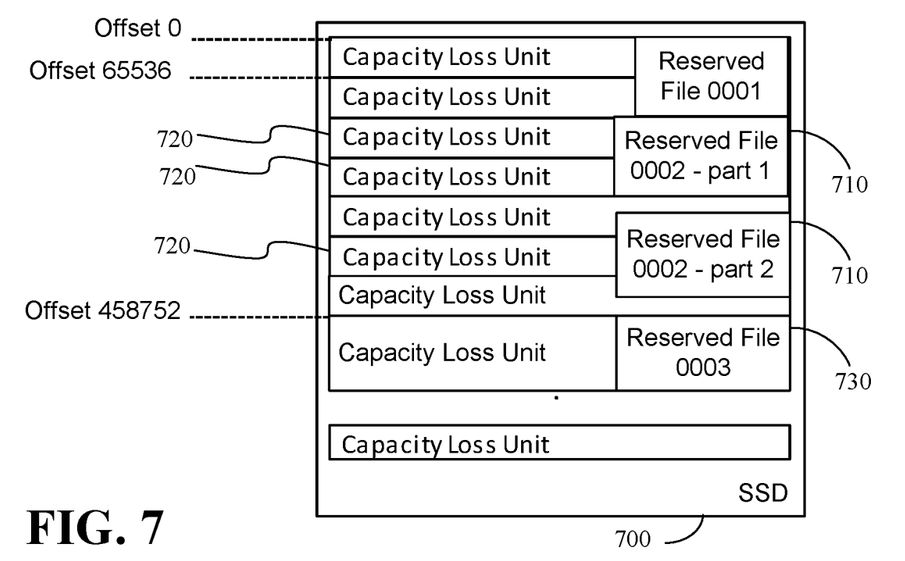

Turning now to FIGS. 5-7, these figures illustrate block diagrams of SSDs during example processes of managing memory resources in an SSD. The sizes, amounts, and numbers used in these embodiments are merely examples and may vary. According to an exemplary embodiment, an SSD may be inserted into a system. A 1 GB partition may be created within a file system on the SSD. A manager application may begin an initialization process, which may include: a) a Victim File List (defined above) not being provided; 2) reading a Capacity Loss Unit Size; and 3) reading the number of Capacity Loss Units. According to this exemplary embodiment, the SSD reports that the Capacity Loss Unit Size is 64 KB and the number of Capacity Loss Units is two (2). In the initialization process if no Reserved Files are found, there is a need to create at least one Reserved File to allocate memory for two (2) Capacity Loss Units. The manager application may then proceed to handle a first Capacity Loss.

In the process of handling two (2) Capacity Loss Units, it may be determined that the Required Capacity is 2*64 KiB=128 KiB. There is 1 GiB of unused space on the file system, which is greater than 128 KiB, so the software may proceed to operation 7 of the Capacity Loss Flow, as described above. Operation 7 of the Capacity Loss Flow reads, "Create the new Reserved File of size equal to the Required Capacity value".

Thus, a new Reserved File 610 in FIG. 6 of 128 KiB may be created. This new Reserved File 610 may be created in a special directory (e.g., Reserved/Reserved0001.file or in a root directory). The new Reserved File 610 may be placed in one sub-region of SSD 600 of FIG. 6, where the Byte Offset is 0 and the size of the Reserved File 610 is 128 KiB. Two Capacity Loss Units 620 are reserved via the new Reserved File 610.

According to the exemplary embodiment, the usable size of the new Reserved File 610 may be calculated. The usable size of the Reserved File 610 may be 128 KiB, which is the same size as the Required Capacity value, so the software proceeds to a new operation.

A command to at least partially erase Capacity Loss Units, may be sent to the two (2) first Capacity Loss Units 620 in FIG. 6, and the manager application may register for a new asynchronous Capacity Loss Event to detect any future losses in capacity. That is, a manager application may register itself to be notified when a Capacity Loss Event occurs.

In a subsequent operation according to an exemplary embodiment, an SSD may send a Capacity Loss Event, which the manager application may then manage. Accordingly, Capacity Loss Units may then be read based on the subsequent operation. In the subsequent operation, an SSD may report, for example, six (6) Capacity Loss Units. Since previous Capacity Loss Units were reported as two (2), the Required Capacity value is equal to (6−2)*64 KiB=256 KiB. The software of the manager application may then read unused space on the file system. In this example, the unused space is 100 MiB, so the software may proceed to operation 7 of the Capacity Loss Flow, as described above, since the amount of file system unused space is greater than the than the Required Capacity value.

Similar to above, new Reserved Files 710 (FIG. 7), totaling 256 KiB may be created. The new Reserved Files 710 may be placed in two sub-regions of the SSD 700. The Byte Offset for one Reserved File may be 131072 (128 KiB) and 270336 for the other.

According to the exemplary embodiment represented by FIG. 7, only three (3) whole Capacity Loss Units 720 are part of the Reserved Files 710—the third, fourth, and sixth Capacity Loss Units 720.

Usable Size of the Capacity Loss Units 720 may be equal to 3*64 KiB=192 KiB, which is less than the Required Capacity value of 256 KiB—so the software may proceed to operation 3 of the Capacity Loss Flow (above) with a new Required Capacity value, which is 256 KiB−192 KiB=64 KiB. Operation 3 involves checking free space (unused space) on the file system.

Software implemented via a manager application may read unused space on the file system as approximately 99.8 MiB, so the software may proceed to operation 7 of the Capacity Loss Flow algorithm (above). A new Reserved File 730 of 64 KiB may be created in, for example, a special directory (e.g., Reserved/Reserved0003.file). The new Reserved File may be physically allocated to one particular sub-region of an SSD 700 (FIG. 7), where the Byte Offset is 458752 and the size is 64 KiB. Next, a Usable Size of the new Reserved File 730 may be calculated.

In FIGS. 5-7, the Usable Size may be the number of bytes that are aligned with a Capacity Loss Unit. It may be determined that a Usable Size of the Reserved File 730 is equal to 64 KiB. The manager application may determine whether the calculated Usable Size of the Reserved File 730 is the same as the Required Capacity value, and if so the manager application may proceed to the next operation. A command to at least partially erase Capacity Loss Units, may be sent to the $3^{rd}$, $4^{th}$, $6^{th}$, and $8^{th}$ Capacity Loss Units, which are in their entirety part of Reserved Files of the SSD. The manager application may then register for a new asynchronous Capacity Loss Event, which may be performed by sending a command to the SSD.

Figure 8:
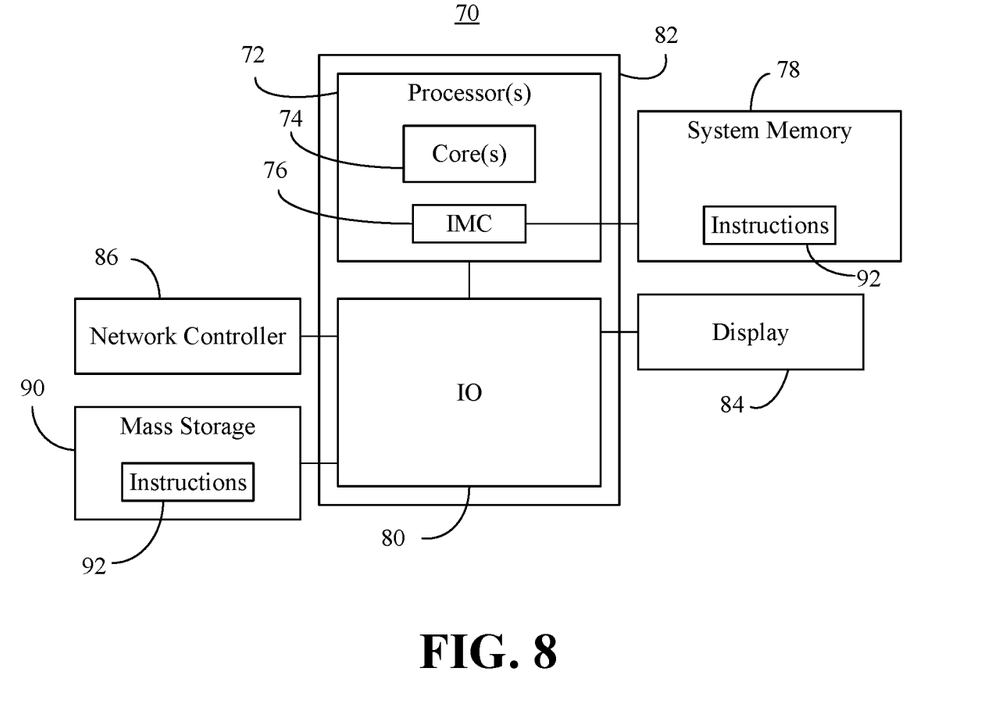
FIG. 8 is a block diagram of an example of a computing system according to an embodiment.

Turning now to FIG. 8, an exemplary system 70 having a storage drive (e.g., mass storage 90) is shown. The system 70 may generally be part of an electronic device/platform having computing functionality (e.g., personal digital assistant/PDA, notebook computer, tablet computer, convertible tablet, server), communications functionality (e.g., smart phone), imaging functionality (e.g., camera, camcorder), media playing functionality (e.g., smart television/TV), wearable functionality (e.g., watch, eyewear, headwear, footwear, jewelry), vehicular functionality (e.g., car, truck, motorcycle), robotic functionality (e.g., autonomous robot), etc., or any combination thereof. In the illustrated example, the system 70 includes one or more processors 72 (e.g., host processor(s), central processing unit(s)/CPU(s)) having one or more cores 74 and an integrated memory controller (IMC) 76 that is coupled to a system memory 78.

The illustrated system 70 also includes an input output (TO) module 80 implemented together with the processor(s) 72 on a semiconductor die 82 as a system on chip (SoC), wherein the IO module 80 functions as a host device and may communicate with, for example, a display 84 (e.g., touch screen, liquid crystal display/LCD, light emitting diode/LED display), a network controller 86 (e.g., wired and/or wireless), and mass storage 90 (e.g., hard disk drive/HDD, optical disk, solid state drive/SSD, flash memory). The processor(s) 72 may execute instructions 92 retrieved from the system memory 78 and/or the mass storage 90 via a manager application to perform one or more aspects of the method 50 (FIG. 4).

The mass storage 90 contains a memory structure that may include either volatile memory or non-volatile memory. Non-volatile memory is a storage medium that does not require power to maintain the state of data stored by the medium. In one embodiment, the memory structure is a block addressable storage device, such as those based on NAND or NOR technologies. A storage device may also include future generation nonvolatile devices, such as a three-dimensional (3D) crosspoint memory device, or other byte addressable write-in-place nonvolatile memory devices. In one embodiment, the storage device may be or may include memory devices that use silicon-oxide-nitride-oxide-silicon (SONOS) memory, electrically erasable programmable read-only memory (EEPROM), chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory. The storage device may refer to the die itself and/or to a packaged memory product. In some embodiments, 3D crosspoint memory may comprise a transistor-less stackable cross point architecture in which memory cells sit at the intersection of word lines and bit lines and are individually addressable and in which bit storage is based on a change in bulk resistance. In particular embodiments, a memory module with non-volatile memory may comply with one or more standards promulgated by the Joint Electron Device Engineering Council (JEDEC), such as JESD218, JESD219, JESD220-1, JESD223B, JESD223-1, or other suitable standard (the JEDEC standards cited herein are available at jedec.org).

Volatile memory is a storage medium that requires power to maintain the state of data stored by the medium. Examples of volatile memory may include various types of random access memory (RAM), such as dynamic random access memory (DRAM) or static random access memory (SRAM). One particular type of DRAM that may be used in a memory module is synchronous dynamic random access memory (SDRAM). In particular embodiments, DRAM of the memory modules complies with a standard promulgated by JEDEC, such as JESD79F for Double Data Rate (DDR) SDRAM, JESD79-2F for DDR2 SDRAM, JESD79-3F for DDR3 SDRAM, or JESD79-4A for DDR4 SDRAM (these standards are available at jedec.org). Such standards (and similar standards) may be referred to as DDR-based standards and communication interfaces of the storage devices that implement such standards may be referred to as DDR-based interfaces.

Thus, execution of the instructions 92 may cause the system 70 to initialize, by a manager application, an initialization flow to manage memory resources of an SSD, and if the SSD loses capacity, determine the amount of capacity loss, create a new reserved file based on the capacity loss, and at least partially erase the new reserved file so that memory space associated with the new reserved file is used by the SSD.

Figure 9:
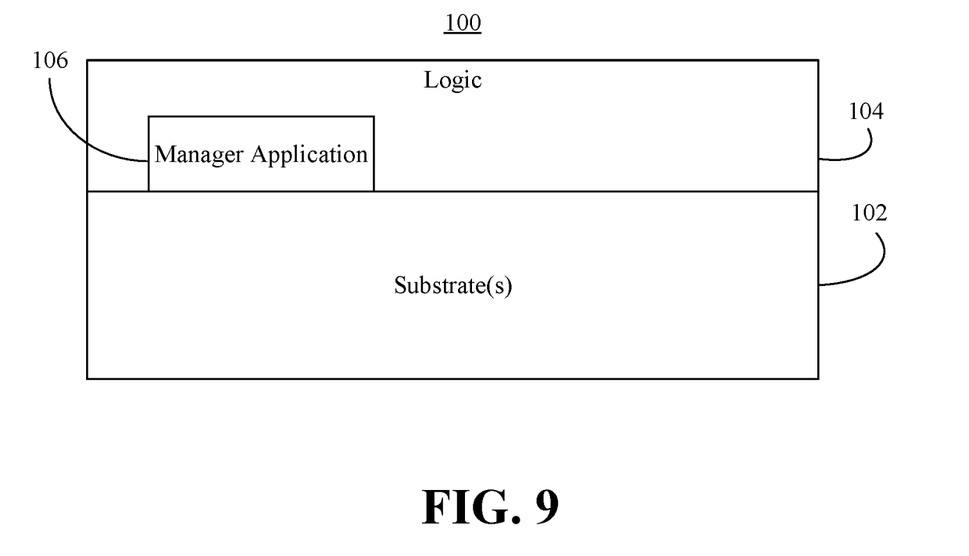
FIG. 9 is an illustration of an example of a semiconductor package according to an exemplary embodiment.

FIG. 9 shows a semiconductor package apparatus 100. The apparatus 100 may be readily substituted for the semiconductor die 82 (FIG. 8), already discussed. The illustrated apparatus 100 includes one or more substrates 102 (e.g., silicon, sapphire, gallium arsenide) and logic 104 (e.g., transistor array and other integrated circuit/IC components) coupled to the substrate(s) 102. The logic 104 may be implemented at least partly in configurable logic or fixed-functionality hardware logic. The illustrated logic 104 includes a manager application 106. The logic 104 may generally implement one or more aspects of the method 50 (FIG. 4). Accordingly, the logic 104 may initialize, by the manager application 106, an initialization flow to manage memory resources of an SSD, and if the SSD loses capacity, determine the amount of capacity loss, create a new reserved file based on the capacity loss, and at least partially erase the new reserved file so that memory space associated with the new reserved file is used by the SSD.

In one example, the logic 104 includes transistor channel regions that are positioned (e.g., embedded) within the substrate(s) 102. Thus, the interface between the logic 104 and the substrate(s) 102 may not be an abrupt junction. The logic 104 may also be considered to include an epitaxial layer that is grown on an initial wafer of the substrate(s) 102.

Figure 10:
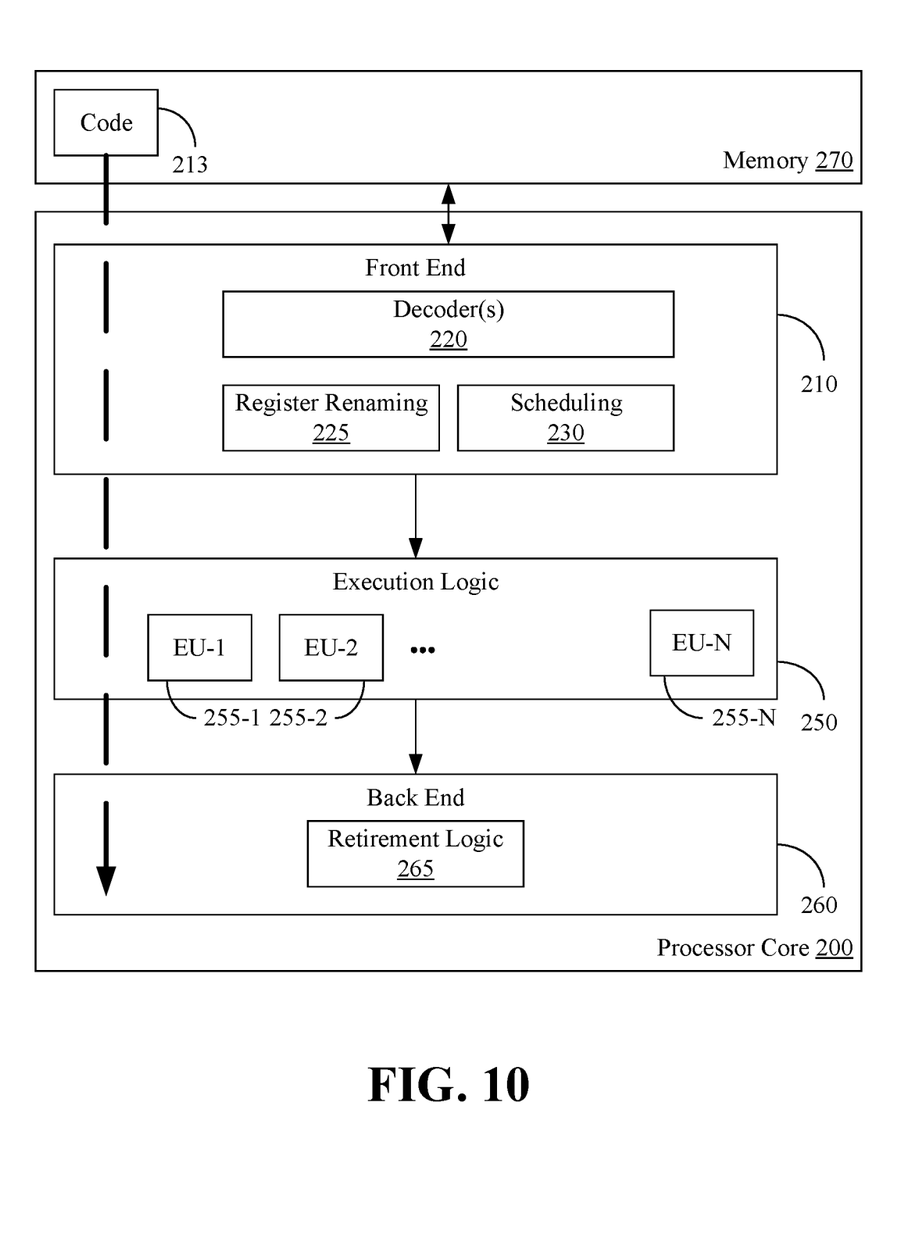
FIG. 10 is a block diagram of an example of a processor according to an embodiment.

FIG. 10 illustrates a processor core 200 according to one embodiment. The processor core 200 may be the core for any type of processor, such as a micro-processor, an embedded processor, a digital signal processor (DSP), a network processor, or other device to execute code. Although only one processor core 200 is illustrated in FIG. 10, a processing element may alternatively include more than one of the processor core 200 illustrated in FIG. 10. The processor core 200 may be a single-threaded core or, for at least one embodiment, the processor core 200 may be multithreaded in that it may include more than one hardware thread context (or "logical processor") per core.

FIG. 10 also illustrates a memory 270 coupled to the processor core 200. The memory 270 may be any of a wide variety of memories (including various layers of memory hierarchy) as are known or otherwise available to those of skill in the art. The memory 270 may include one or more code 213 instruction(s) to be executed by the processor core 200, wherein the code 213 may implement the method 50 (FIG. 4), already discussed. The processor core 200 follows a program sequence of instructions indicated by the code 213. Each instruction may enter a front end portion 210 and be processed by one or more decoders 220. The decoder 220 may generate as its output a micro operation such as a fixed width micro operation in a predefined format, or may generate other instructions, microinstructions, or control signals which reflect the original code instruction. The illustrated front end portion 210 also includes register renaming logic 225 and scheduling logic 230, which generally allocate resources and queue the operation corresponding to the convert instruction for execution.

The processor core 200 is shown including execution logic 250 having a set of execution units 255-1 through 255-N. Some embodiments may include a number of execution units dedicated to specific functions or sets of functions. Other embodiments may include only one execution unit or one execution unit that can perform a particular function. The illustrated execution logic 250 performs the operations specified by code instructions.

After completion of execution of the operations specified by the code instructions, back end logic 260 retires the instructions of the code 213. In one embodiment, the processor core 200 allows out of order execution but requires in order retirement of instructions. Retirement logic 265 may take a variety of forms as known to those of skill in the art (e.g., re-order buffers or the like). In this manner, the processor core 200 is transformed during execution of the code 213, at least in terms of the output generated by the decoder, the hardware registers and tables utilized by the register renaming logic 225, and any registers (not shown) modified by the execution logic 250.

Although not illustrated in FIG. 10, a processing element may include other elements on chip with the processor core

200. For example, a processing element may include memory control logic along with the processor core 200. The processing element may include I/O control logic and/or may include I/O control logic integrated with memory control logic. The processing element may also include one or more caches.

Figure 11:
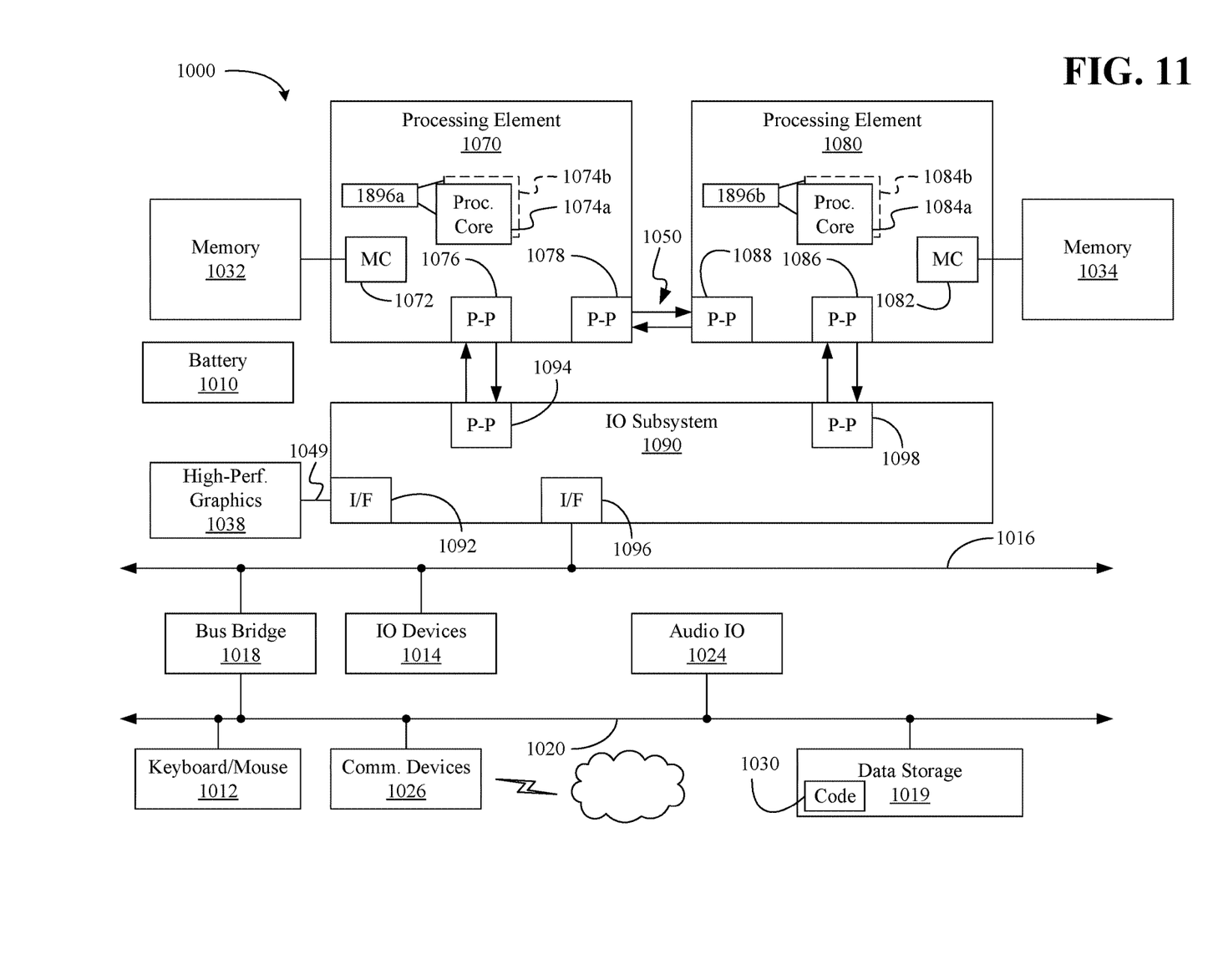
FIG. 11 is a block diagram of an example of a multi-processor based computing system according to an embodiment.

Referring now to FIG. 11, shown is a block diagram of a computing system 1000 embodiment in accordance with an embodiment. Shown in FIG. 11 is a multiprocessor system 1000 that includes a first processing element 1070 and a second processing element 1080. While two processing elements 1070 and 1080 are shown, it is to be understood that an embodiment of the system 1000 may also include only one such processing element.

The system 1000 is illustrated as a point-to-point interconnect system, wherein the first processing element 1070 and the second processing element 1080 are coupled via a point-to-point interconnect 1050. It should be understood that any or all of the interconnects illustrated in FIG. 11 may be implemented as a multi-drop bus rather than point-to-point interconnect.

As shown in FIG. 11, each of processing elements 1070 and 1080 may be multicore processors, including first and second processor cores (i.e., processor cores 1074a and 1074b and processor cores 1084a and 1084b). Such cores 1074a, 1074b, 1084a, 1084b may be configured to execute instruction code in a manner similar to that discussed above in connection with FIG. 10.

Each processing element 1070, 1080 may include at least one shared cache 1896a, 1896b. The shared cache 1896a, 1896b may store data (e.g., instructions) that are utilized by one or more components of the processor, such as the cores 1074a, 1074b and 1084a, 1084b, respectively. For example, the shared cache 1896a, 1896b may locally cache data stored in a memory 1032, 1034 for faster access by components of the processor. In one or more embodiments, the shared cache 1896a, 1896b may include one or more mid-level caches, such as level 2 (L2), level 3 (L3), level 4 (L4), or other levels of cache, a last level cache (LLC), and/or combinations thereof.

While shown with only two processing elements 1070, 1080, it is to be understood that the scope of the embodiments is not so limited. In other embodiments, one or more additional processing elements may be present in a given processor. Alternatively, one or more of processing elements 1070, 1080 may be an element other than a processor, such as an accelerator or a field programmable gate array. For example, additional processing element(s) may include additional processors(s) that are the same as a first processor 1070, additional processor(s) that are heterogeneous or asymmetric to processor a first processor 1070, accelerators (such as, e.g., graphics accelerators or digital signal processing (DSP) units), field programmable gate arrays, or any other processing element. There can be a variety of differences between the processing elements 1070, 1080 in terms of a spectrum of metrics of merit including architectural, micro architectural, thermal, power consumption characteristics, and the like. These differences may effectively manifest themselves as asymmetry and heterogeneity amongst the processing elements 1070, 1080. For at least one embodiment, the various processing elements 1070, 1080 may reside in the same die package.

The first processing element 1070 may further include memory controller logic (MC) 1072 and point-to-point (P-P) interfaces 1076 and 1078. Similarly, the second processing element 1080 may include a MC 1082 and P-P interfaces 1086 and 1088. As shown in FIG. 11, MC's 1072 and 1082 couple the processors to respective memories, namely a memory 1032 and a memory 1034, which may be portions of main memory locally attached to the respective processors. While the MC 1072 and 1082 is illustrated as integrated into the processing elements 1070, 1080, for alternative embodiments the MC logic may be discrete logic outside the processing elements 1070, 1080 rather than integrated therein.

The first processing element 1070 and the second processing element 1080 may be coupled to an I/O subsystem 1090 via P-P interconnects 1076 1086, respectively. As shown in FIG. 11, the I/O subsystem 1090 includes P-P interfaces 1094 and 1098. Furthermore, I/O subsystem 1090 includes an interface 1092 to couple I/O subsystem 1090 with a high performance graphics engine 1038. In one embodiment, bus 1049 may be used to couple the graphics engine 1038 to the I/O subsystem 1090. Alternately, a point-to-point interconnect may couple these components.

In turn, I/O subsystem 1090 may be coupled to a first bus 1016 via an interface 1096. In one embodiment, the first bus 1016 may be a Peripheral Component Interconnect (PCI) bus, or a bus such as a PCI Express bus or another third generation I/O interconnect bus, although the scope of the embodiments is not so limited.

As shown in FIG. 11, various I/O devices 1014 (e.g., biometric scanners, speakers, cameras, sensors) may be coupled to the first bus 1016, along with a bus bridge 1018 which may couple the first bus 1016 to a second bus 1020. In one embodiment, the second bus 1020 may be a low pin count (LPC) bus. Various devices may be coupled to the second bus 1020 including, for example, a keyboard/mouse 1012, communication device(s) 1026, and a data storage unit 1019 such as a disk drive or other mass storage device which may include code 1030, in one embodiment. The illustrated code 1030 may implement the method 50 (FIG. 4), already discussed, and may be similar to the code 213 (FIG. 10), already discussed. Further, an audio I/O 1024 may be coupled to second bus 1020 and a battery 1010 may supply power to the computing system 1000.

Note that other embodiments are contemplated. For example, instead of the point-to-point architecture of FIG. 11, a system may implement a multi-drop bus or another such communication topology. Also, the elements of FIG. 11 may alternatively be partitioned using more or fewer integrated chips than shown in FIG. 11.

Additional Notes and Examples:

Example 1 may include a system comprising a storage drive, a semiconductor apparatus coupled to the storage drive, the semiconductor apparatus including one or more substrates and logic coupled to the one or more substrates, the logic coupled to the one or more substrates to: determine an amount of capacity loss of the storage drive; create a file that is associated with logical memory space in a file system, based on the amount of the capacity loss; and erase at least a portion of the file so that logical memory space associated with an un-erased portion of the file is usable by the storage drive.

Example 2 may include the system of Example 1, wherein the amount of capacity loss relates to loss of logical memory space, and wherein an initialization flow to manage resources in the storage drive is to be triggered when the storage drive is discovered in the system.

Example 3 may include the system of Example 1, wherein an initialization flow to manage resources in the storage drive is to be triggered when a new partition is created.

Example 4 may include the system of Example 1, wherein the SSD is a solid-state drive.

Example 5 may include the system of Example 1, wherein the logic coupled to the one or more substrates is to read a capacity loss unit size, and read a number of capacity loss units to trigger an initialization flow.

Example 6 may include the system of any one of Examples 1 to 5, wherein, if the storage drive loses capacity, the logic coupled to the one or more substrates further is to register for a new capacity loss event.

Example 7 may include a semiconductor apparatus comprising one or more substrates, and logic coupled to the one or more substrates, wherein the logic is implemented at least partly in one or more of configurable logic or fixed-functionality hardware logic, the logic coupled to the one or more substrates to determine an amount of capacity loss of a storage drive, create a file that is associated with logical memory space in a file system, based on the amount of capacity loss, and erase at least a portion of the file so that logical memory space associated with an un-erased portion of the file is usable by the storage drive.

Example 8 may include the apparatus of Example 7, wherein the amount of capacity loss relates to loss of logical memory space, and wherein an initialization flow to manage resources is to be triggered when the storage drive is discovered in a system.

Example 9 may include the apparatus of Example 7, wherein an initialization flow to manage resources is to be triggered when a new partition is created.

Example 10 may include the apparatus of Example 7, wherein the storage drive is a solid-state drive.

Example 11 may include the apparatus of Example 7, wherein the logic coupled to the one or more substrates is to read a capacity loss unit size, and read a number of capacity loss units to trigger an initialization flow.

Example 12 may include the apparatus of any one of Examples 7 to 11, wherein, if the storage drive loses capacity, the logic coupled to the one or more substrates further is to register for a new capacity loss event.

Example 13 may include at least one computer readable storage medium comprising a set of instructions, which when executed by a computing system, cause the computing system to determine an amount of capacity loss of a storage drive, create a file that is associated with logical memory space in a file system, based on the amount of capacity loss, and erase at least a portion of the file so that logical memory space associated with an un-erased portion of the file is usable by the storage drive.

Example 14 may include the least one computer readable storage medium of Example 14, wherein the amount of capacity loss relates to loss of logical memory space, and wherein an initialization flow to manage resources of the storage drive is to be triggered when the storage drive is discovered in a system.

Example 15 may include the least one computer readable storage medium of Example 13, an initialization flow to manage resources of the storage drive is to be triggered when a new partition is created.

Example 16 may include the least one computer readable storage medium of Example 13, wherein the storage drive is a solid-state drive.

Example 17 may include the least one computer readable storage medium of Example 13, wherein the set of instructions, when executed, cause the computing system to read a capacity loss unit size, and read a number of capacity loss units to trigger an initialization flow.

Example 18 may include the least one computer readable storage medium of any one of Examples 13 to 17, wherein the set of instructions, when executed, further cause the computing system to, if the storage drive loses capacity, register for a new capacity loss event.

Example 19 may include a method comprising determining an amount of capacity loss of a storage drive, creating a file that is associated with logical memory space in a file system, based on an amount of capacity loss, and erasing at least a portion of the file so that logical memory space associated with an un-erased portion of the file is usable by the storage drive.

Example 20 may include the method of Example 19, wherein the amount of capacity loss relates to loss of logical memory space, and wherein an initialization flow is to be triggered when the storage drive is discovered in a system.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the computing system within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. A system comprising:
 a storage drive; and
 a semiconductor apparatus coupled to the storage drive, the semiconductor apparatus including one or more substrates and logic coupled to the one or more substrates, the logic coupled to the one or more substrates to:
  in response to creating a new partition in the storage drive, triggering an initialization flow comprising:
   reading a capacity loss unit size of each of a plurality of capacity loss units; and
   reading a number of the plurality of capacity loss units;
  in response to determining a capacity loss relating to logical memory space that has failed in the storage drive:
   determining a difference between a number of plurality of capacity loss units and a previous number of capacity loss units;
   calculating a required capacity value based on the difference and the capacity loss unit size;
   creating a new reserved file with a size equal to the required capacity value to match the capacity loss; and
   erasing a portion of the new reserved file, wherein logical memory space associated with an un-erased portion of the new reserved file is usable by the storage drive.

2. The system of claim 1, wherein the storage drive is a solid-state drive.

3. The system of claim 1, wherein, in response to determining another capacity loss in the storage drive, the logic coupled to the one or more substrates further is to register for a new capacity loss event.

4. A semiconductor apparatus comprising:
 one or more substrates; and
 logic coupled to the one or more substrates, wherein the logic is implemented at least partly in one or more of configurable logic or fixed-functionality hardware logic, the logic coupled to the one or more substrates to:
  in response to creating a new partition in the storage drive, triggering an initialization flow comprising:
   reading a capacity loss unit size of each of a plurality of capacity loss units; and
   reading a number of the plurality of capacity loss units;
  in response to determining a capacity loss relating to logical memory space that has failed in the storage drive:
   determining a difference between a number of plurality of capacity loss units and a previous number of capacity loss units;
   calculating a required capacity value based on the difference and the capacity loss unit size;
   creating a new reserved file with a size equal to the required capacity value to match the capacity loss; and
   erasing a portion of the new reserved file, wherein logical memory space associated with an un-erased portion of the new reserved file is usable by the storage drive.

5. The semiconductor apparatus of claim 4, wherein the storage drive is a solid-state drive.

6. The semiconductor apparatus of claim 4, wherein, in response determining another capacity loss in the storage drive, the logic coupled to the one or more substrates further is to register for a new capacity loss event.

7. At least one non-transitory computer readable storage medium comprising a set of instructions, which when executed by a computing system, cause the computing system to:
 in response to creating a new partition in the storage drive, triggering an initialization flow comprising:
  reading a capacity loss unit size of each of a plurality of capacity loss units;
  reading a number of the plurality of capacity loss units;
 in response to determining a capacity loss relating to logical memory space that has failed in the storage drive:
  determining a difference between a number of plurality of capacity loss units and a previous number of capacity loss units;
  calculating a required capacity value based on the difference and the capacity loss unit size;
  creating a new reserved file with a size equal to the required capacity value to match the capacity loss; and
  erasing a portion of the new reserved file, wherein logical memory space associated with an un-erased portion of the new reserved file is usable by the storage drive.

8. The at least one non-transitory computer readable storage medium of claim 7, wherein the storage drive is a solid-state drive.

9. The at least one non-transitory computer readable storage medium of claim 7, wherein the set of instructions, when executed, further cause the computing system to, in response to determining another capacity loss in the storage drive, register for a new capacity loss event.

* * * * *